July 16, 1946. E. W. SCHLIEBEN 2,404,195
CARGO AIRCRAFT
Filed June 29, 1943 2 Sheets-Sheet 2

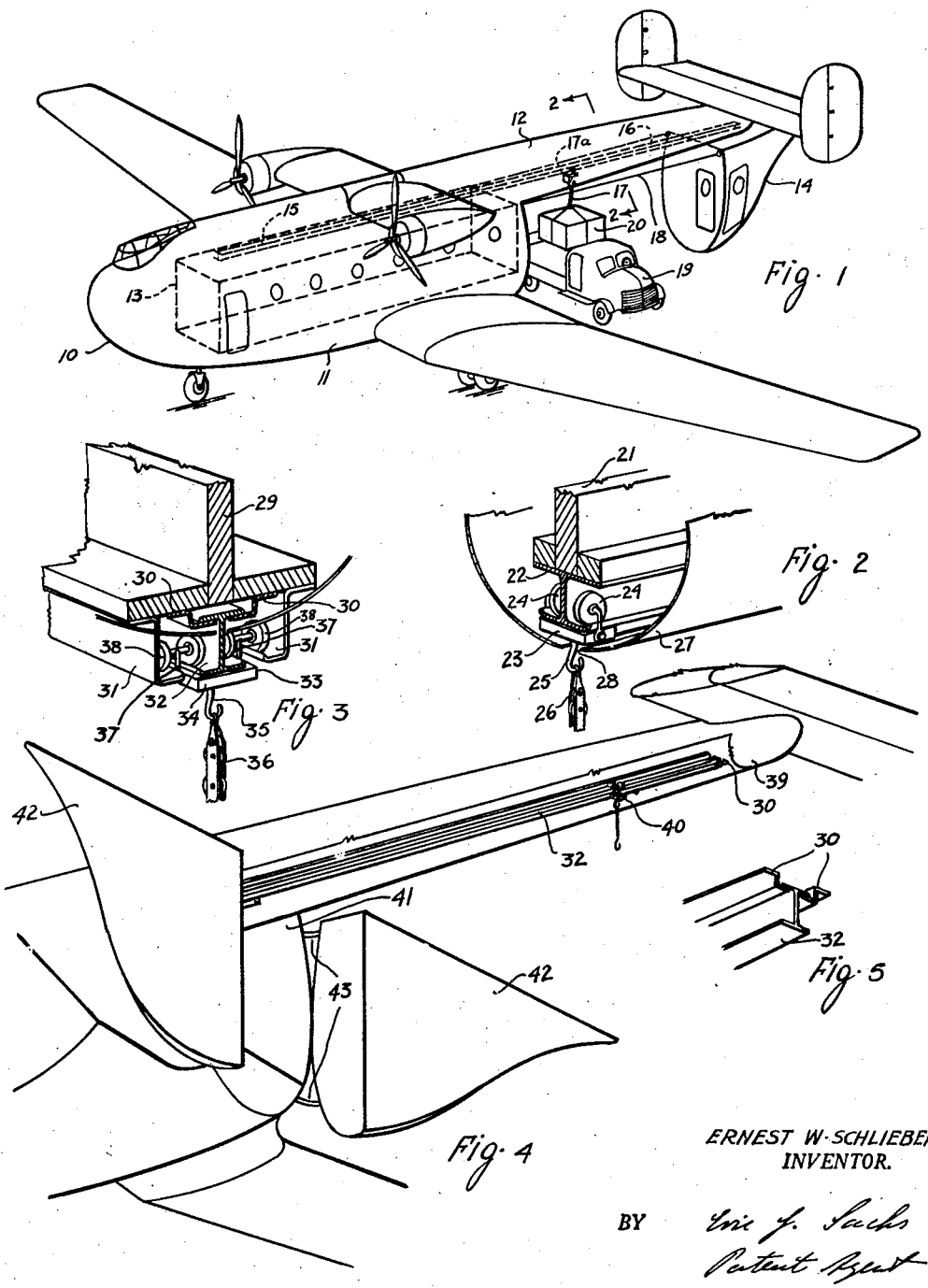

ERNEST W. SCHLIEBEN
INVENTOR.

Patented July 16, 1946

2,404,195

UNITED STATES PATENT OFFICE 2,404,195

CARGO AIRCRAFT

Ernest W. Schlieben, Scarsdale, N. Y., assignor to York Research Corporation, New York, N. Y.

Application June 29, 1943, Serial No. 492,699

5 Claims. (Cl. 244—137)

1

This invention relates to certain improvements in aircraft, more particularly it relates to cargo aircraft having a cargo-compartment which occupies a substantial part of the useful space inside the fuselage of the aircraft and which has an aft opening for loading and unloading the cargo.

It is highly desirable that cargo aircraft be so designed as to facilitate the handling of all types of cargo as efficiently as possible and to utilize as much as possible of the space available in an aircraft. The main purpose of using aircraft as means of cargo transportation is speed, and therefore everything must be done to speed up the handling of the load at an airport.

The primary object of this invention is to provide the aircraft with means which allow quick and safe movement of the cargo into and out of the cargo compartment;

Another object of the invention is to provide for free and undisturbed access to the cargo-compartment;

A further object of the invention is to facilitate opening and closing of the cargo compartment;

A further object is to make it possible to load and unload a cargo aircraft immediately from or onto a vehicle, e. g. a truck or a railway freight car;

A still further object of the invention is to adjust the position of the cargo compartment floor relative to the cargo handling facilities available in the airport.

Other objects and a fuller understanding of the invention may be had by referring to the following description and claims taken in conjunction with the accompanying drawings which shall, however, be in no way limitative but merely illustrative to explain the nature and operation of the invention.

It has been proposed to provide in an aircraft, beneath the pilot's cockpit and a passenger compartment, a cargo compartment with a monorail arranged at the ceiling of the compartment, and a front door for loading and unloading. With this device, much height is lost for the cargo compartment and it is not possible to unload immediately on to another vehicle as the load cannot be far enough removed from the cargo compartment proper to be put on any other vehicle.

According to the present invention, a spacious cargo compartment is arranged in the main body of the fuselage of an aircraft which takes up substantially the entire cross section of the body. The opening is provided at the aft end of the cargo compartment and the tail portion of the aircraft, which has a considerably smaller cross section than the cargo compartment, extends from the center top of the rear end of the body part. While no limitations exist for the height of the cargo compartment itself inside the fuselage, the height of the access opening is only limited by the thickness of the tail portion. Otherwise, the entire access opening is unobstructed and provides easy access for very bulky goods.

A guide or crane rail is provided at the ceiling of the cargo compartment which extends or is extendable rearward along the tail part and allows loading or unloading of trucks and the like immediately by means of a chain-fall travelling along the guide rail.

Further details of the invention will be understood in connection with the following description and drawings. Though, in the drawings, a powered airplane is shown, the invention is as well applicable to any other type of aircraft, e. g. gliders or the like. The term "fuselage" is, in the technical language, not always used in the same sense. In the present specification the term "main body part" and "tail part" of the fuselage are used. This does not necessarily mean that these are two constructively separate parts, but in the outward appearance of the aircraft used, a definite differentiation between these parts can be made. Many different variations and combinations are possible within the scope of the claims.

In the drawings:

Fig. 1 shows a perspective view of an aircraft provided with a cargo compartment; the rear closure is opened and a truck is in position to be loaded or unloaded;

Fig. 2 shows a perspective detail of an embodiment of the guide rail used with the plane shown in Fig. 1. The detail is shown as a section taken along line 2—2 of Fig. 1;

Fig. 3 illustrates another embodiment of the invention, showing a perspective detail of two guide rails, one of which is extractable;

Fig. 4 shows a perspective part view of the rear end of an aircraft provided with an extracted guide rail, the closure of the compartment being opened;

Fig. 5 is an end view in larger scale of the extracted rail shown in Fig. 4;

Figure 6:
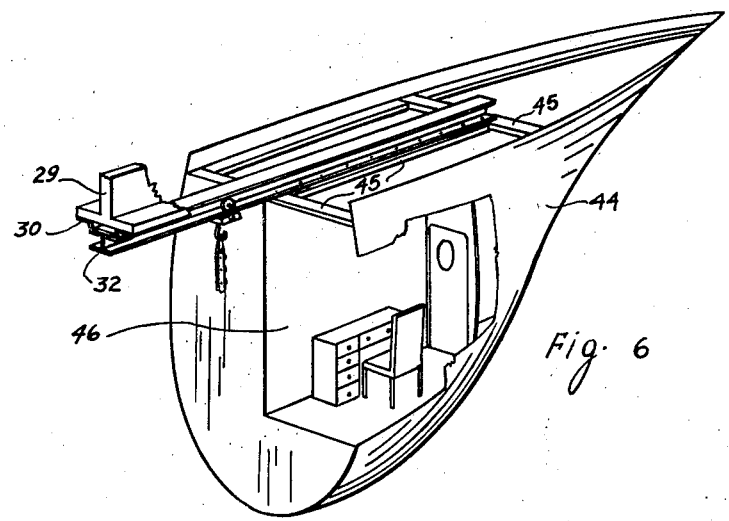
Fig. 6 illustrates in a perspective view an embodiment of the rear closure of the cargo compartment connected with an extractable guide rail.

Referring to Fig. 1 of the drawings, the fuselage of the airplane 10 comprises a main body part 11 and a tail part 12. The tail part is of considerably smaller cross section than the main body part and extends rearwards from the top end of the main body part. The main body part contains a large cargo compartment 13 which is shown in Fig. 1 in broken lines. The cargo compartment opens towards the rear and can be closed by the closure 14 which is slidably mounted on the tail part 12 and shown in its open position. Guide means such as a monorail 15 is indicated with broken lines at the ceiling of the cargo compartment; the monorail extends towards the rear of the airplane along the tail part as shown at 16. The closure 14 can slide along the extension of the monorail to open and close the cargo compartment. A chain fall 17 is shown attached to conventional conveying means 17a which are movable in well known manner along the guide or monorail 15, 16. Special means of any arbitrary design such as wires 18 may be provided for the movement of the closure 14 along part 16 of the guide rail. The conventional conveying means 17a may be of any arbitrary design. They may comprise an ordinary hook rotatable in any kind of supporting member or crane carriage which can move along the guide rails as for instance shown in Figs. 2 and 3 of the drawings.

As can be seen from Fig. 1, the tail part 12 of the airplane is arranged so high above the ground that a truck 19 can easily move under the tail and be directly loaded or unloaded by means of the chain fall 17. In Fig. 1 a load 20 is shown being lowered on to the truck.

Fig. 2 illustrates a possible embodiment of the guide rail used according to Fig. 1. 21 indicates a beam which may be any conventional fuselage beam and forms part of the airplane structure. Attached to beam 21 is an I-shaped guide rail 22. A crane carriage 23 is suspended from the lower flange of the I-beam by means of two rollers 24, and a hook 25 is provided with a chain 26 to attach the load. At 27 the skin or fairing of the tail part is indicated which has at its under side a slot 28 along which the hook 25 moves when the crane carriage is operated.

In order to load or unload the cargo compartment 13 the closure 14 is slid backwards towards the end of the tail part and a truck or freight car or any other load carrying means is moved under the tail part between the closure and the rear opening of the cargo compartment. By means of the chain fall which can be moved all along the guide rail, the load can be picked up and easily moved to the proper place. The chain fall may be moved along the guide rails by hand or by any conventional mechanical means or by electric propulsion. As all means for handling the load are contained in the aircraft itself and no additional equipment is needed, it is obvious that the loading and unloading operations can be performed with great ease and speed.

If conditions prevail which make it inconvenient to have a permanent main guide rail installed along the tail part, an extractable, second guide rail may be used as illustrated in Fig. 3 of the drawings which is, when not in use, accommodated inside the cargo compartment. The section shown in Fig. 3 is taken just at the beginning of the tail part looking towards the main body part of the plane. A part of the skin of the tail part is indicated to illustrate that, as long as the second, extractable guide rail is not used, only a slot is visible in the tail part along which the extractable guide rail can move. The fuselage beam 29 may carry at its lower flange two pairs of Z-shaped guide rails 30 and 31 which may be attached to the fuselage beam in any conventional way, for instance by screws. The inner pair of Z-rails 30 serves as a guide for an I-shaped extractable guide rail 32 which slides with its upper flanges on the lower flanges of the Z-shaped guide rails. The outer Z-shaped guides 31 serve as a fixed guide rail for the crane carriage 33 as can be seen from Fig. 3. The crane carriage consists of a plate 34 to which the hook 35 and chain 36 are attached. Extending upwards from plate 34 are brackets 37 which carry four wheels 38. The two innermost wheels roll, as shown, on the lower flanges of the I-shaped guide rail, while the two outer wheels roll on the two lower flanges of the outer Z-shaped rails.

Rail 32 is so dimensioned that, in its retracted position, it is accommodated entirely inside the cargo compartment. When extracted the rail extends substantially along the entire tail part of the plane as will be shown in connection with Fig. 4. As long as rail 32 is in its retracted position, the crane carriage 33 is supported with all four wheels on both, the fixed and the extractable guide rail. When, however, the extractable guide rail is extracted the crane carriage rolls inside the cargo compartment on the two outer Z-shaped rails, while outside the cargo compartment, the crane carriage is supported only by the extractable rail and the rollers run along the lower flanges of the I-shaped guide rail.

Fig. 4 shows a perspective bottom view of the rear part of the plane illustrating the extractable guide rail 32 in its extracted position along the tail part 39. A portion of the skin of the tail part has been removed so that the Z-rails 30 can be seen between which the I-rail 32 is guided. These rails extend in the embodiment shown all along the tail part. A crane carriage 40 is shown near the end of the guide rails. Suitable stop members will have to be provided to stop the extractable rail from being extracted too far, and to stop the crane carriage from rolling off the guide rail. Such members are, however, not shown in the drawings as they do not form any part of the invention and would merely confuse the drawings. In the embodiment illustrated in Fig. 4 a closure for the rear opening 41 of the cargo compartment is used which comprises two door-like parts 42 hinged at 43 to the fuselage. The two parts are shaped so that when they are in their closed position they form a stream lined fairing, closing the cargo compartment in a similar way as it is shown in Fig. 1.

Fig. 5 is an end view of the extracted guide rail 32 and the Z-rails 30 as shown in Fig. 4. No further explanation of this figure seems necessary.

Fig. 6 illustrates another embodiment of the invention in connection with an extractable guide rail. 29 indicates the fuselage beam to which the two Z-shaped guides 30 are secured. Sliding in the guides is the I-shaped extractable guide rail 32 which in this embodiment carries at its outermost end a streamlined fairing or closure 44 which closes the cargo compartment. Any suitable way may be chosen to secure the fairing to the rail, for instance bars 45 to which the fairing may be bolted as indicated in Fig. 6.

The fairing or closure 44 contains, in this case, a separate compartment 46 with all necessary equipment of a small office for us by the freight handler. From this compartment the freight handler would be within easy sight of all loading and unloading. Only one single operation is necessary to extend the guide rail towards the rear and at the same time open the cargo compartment. By another single operation the compartment can be closed and at the same time the guide rail pushed back into the cargo compartment. The movement of the guide rail and the fairing can be performed in any convenient manner either by mechanical means operated by hand or by electrical means or the like. It is obvious that a separate compartment can as well be accommodated in one or both halves of the doorlike closure shown in Fig. 4.

Figure 7:
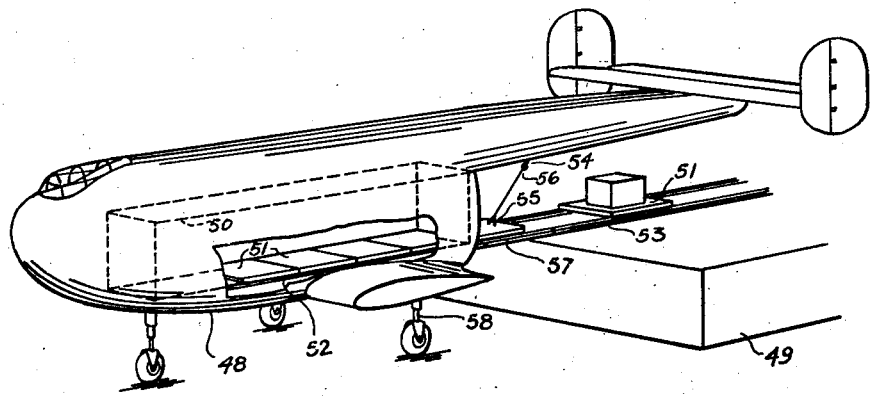
Fig. 7 is a perspective view of an aircraft in position of being loaded or unloaded; parts of the aircraft have been omitted in this view, in order to make the drawings clear.

Fig. 7 shows a further embodiment of the invention. A cargo plane 48, which is only partly shown, has approached a load handling platform 49 installed in an airport. In this case the floor of the cargo compartment 50 (shown in broken lines) consists of a number of rolling floor sections 51 which can be moved along and out of the cargo compartment by means of rails 52 provided near the bottom of the cargo compartment and on corresponding rails 53 provided on the airport platform. The chain fall 54 moving along the guide rail, not shown in Fig. 7, can be used to move the floor sections. For this purpose means such as fittings 55 are provided on each floor section or rolling platform 51 for engagement with a hook 56 of the chain fall 54. By provision of the movable floor sections it is not only very easy to load and unload the cargo compartment, but it is likewise easy to shift the load inside the compartment to re-establish the proper position of the center of gravity of the loaded plane, for instance, if part of the cargo has been unloaded at an intermediate load handling station. In the embodiment shown in Fig. 7 doorlike closures may be used similar to those shown in Fig. 4 which have however been omitted in Fig. 7. Such doors would have to be accommodated, when opened, in a space between the end of the cargo compartment and the platform 49. A bridge like rail carrying part 57 may then be inserted between the rails 52 and 53 to bridge over said space. Such part may be carried within the cargo compartment or it may be part of the load handling installations of the airport.

When rolling floor sections are employed as described before, it is of special importance that the rails or similar supports on which such floor sections move are level with corresponding rails or similar means on the landing field platform. To assure such equal level, it is proposed, according to the invention to make all or part of the ground supports of the plane adjustable within certain limits so that it is possible to adjust the floor of the cargo compartment or at least its outer end to the landing field platform. At 58 adjustable telescopic means for the main wheels of the plane are indicated.

It is obvious that a plane equipped as shown in Fig. 7 can be used for freight handling in many different ways. If no loading facilities for the use of movable floor sections are available at the airfield, the loading and unloading operations can be performed by means of the monorail alone so that the movable floor sections remain stationary. Many alternatives and combinations of the different embodiments of the invention shown in the drawings are possible within the scope of the invention.

What I claim is:

1. In an aircraft comprising a fuselage having a main body part and a tail part of considerably smaller cross section than the main part and extending rearwards from the top end of said main body part, and a cargo-compartment in said main body part with an access opening at its aft end, a guide rail at the ceiling of said cargo-compartment, said guide rail extending for a substantial length beyond said access opening alongside of said tail part, conventional conveying means on said guide rail adapted to hoist a load and move it along said guide rail, and a removable closure for said access opening of said cargo-compartment, said closure being suspended from said guide rail and adapted to slide along the part of said guide rail outside of said cargo-compartment.

2. In an aircraft comprising a fuselage having a main body part and a tail part of considerably smaller cross section than the main part and extending from the top end of said main body part, and a cargo-compartment in said main body part with an access opening at its aft end, a guide rail provided at the ceiling of said cargo-compartment, said guide rail extending for a substantial length towards the rear, alongside of said tail portion, beyond the opening of said cargo-compartment; conventional conveying means cooperative with said guide rail and adapted to hoist a load and move it along said guide rail; and a streamlined fairing forming a closure for said access opening of said cargo-compartment, said fairing forming a separate compartment and being adapted to be moved clear of the access opening of said cargo-compartment.

3. In an aircraft comprising a fuselage having a main body part and a tail part of considerably smaller cross section than the main part and extending from the top end of said main body part, and a cargo-compartment in said main body part with an access opening at its aft end, a guide rail provided at the ceiling of said cargo-compartment, said guide rail extending for a substantial length towards the rear, alongside of said tail portion, beyond the opening of said cargo-compartment; conventional means cooperative with said guide rail and adapted to hoist a load and move it along said guide rail; and a streamlined fairing suspended from said guide rail and adapted to be moved along said guide rail to clear the access opening of said cargo-compartment, said fairing accommodating a separate compartment usable, e. g. as quarters for the freight handler.

4. A cargo carrying aircraft comprising a main fuselage body, a tail part extending rearwards from the center top end of said main body having a considerably smaller cross section than said main body and being located high enough to allow a loaded truck or freight car to move freely under said tail part, a cargo compartment taking up substantially the entire width of said main body, the ceiling of said cargo-compartment being substantially flush with the lower side of said tail part, supporting guide means arranged at the ceiling of said cargo-compartment and extending alongside said tail part towards the end of said tail part, a removable fairing forming a closure of the rear end of said cargo-compartment, said fairing being suspended from said supporting guide means and adapted to slide along said supporting guide means towards the end of said tail part, means at said guide means adapted to move said fairing along said guide means, and means movable along said guide means adapted to hoist a load and move it along said guide means.

5. In a cargo aircraft, the combination of a cargo compartment having a rear opening, a tail boom extending rearwardly from the top of said rear opening, a guide rail positioned adjacent the ceiling of said compartment and extending beyond the rear opening along a portion of said tail boom, a supporting rail carried by said portion of the tail boom, conveying means arranged to travel along said guide rail, said guide rail being comprised of a plurality of sections, one of such sections being rigidly secured within said compartment and extending rearwardly substantially to the rear opening of said compartment, another of said sections extending along said tail boom and being retractable into said compartment, a fairing forming a closure for the rear opening of the cargo compartment and being attached to the rear end of the retractable section of the guide rail and being movable with said retractable portion of the guide rail.

ERNEST W. SCHLIEBEN.